Sept. 10, 1968

A. MICHELSON 3,400,534

HIGH ENERGY DRIVE UNIT

Filed April 11, 1967

INVENTOR.
ANATOL MICHELSON
BY
*Meyer, Tilberry & Body*
ATTORNEYS.

Sept. 10, 1968  A. MICHELSON  3,400,534
HIGH ENERGY DRIVE UNIT
Filed April 11, 1967  2 Sheets-Sheet 2
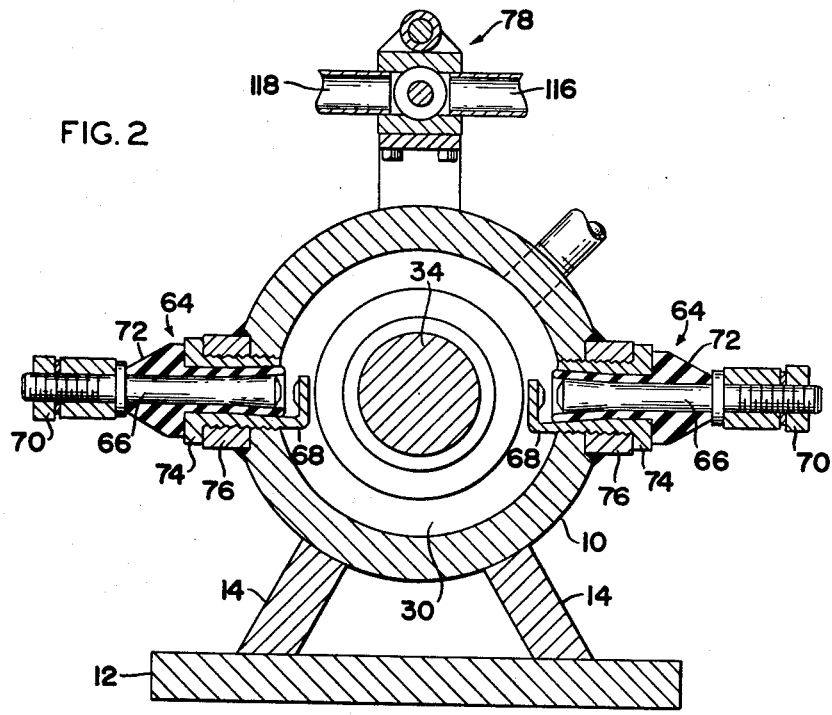
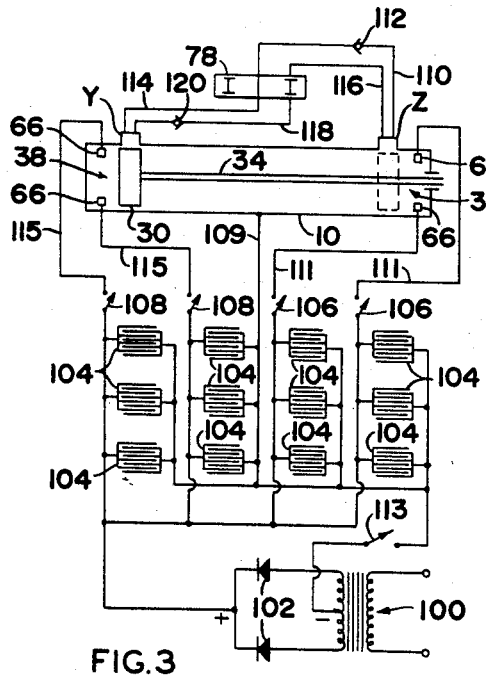
INVENTOR.
ANATOL MICHELSON
BY
Meyer, Tilberry & Body
ATTORNEYS.

United States Patent Office 3,400,534
Patented Sept. 10, 1968

3,400,534
HIGH ENERGY DRIVE UNIT
Anatol Michelson, Glenolden, Pa., assignor to E. W. Bliss Company, Canton, Ohio, a corporation of Delaware
Filed Apr. 11, 1967, Ser. No. 630,124
5 Claims. (Cl. 60—27)

ABSTRACT OF THE DISCLOSURE

An electrohydraulic energy conversion device for reciprocating a member repeatedly along a path and in first and second directions with the second direction being opposite to the first direction. The device comprises a housing forming an elongated chamber extending along the path. A piston is positioned in the chamber to divide the chamber into front and aft cavities. An element is provided to connect the piston to the reciprocating member and an electrically nonconductive and noncombustible liquid is in at least the front cavity. The liquid generally fills the front cavity when the member has been moved in the second direction. Positioned in the front cavity are members forming a spark gap. Power leads connect the members through switches to a power supply including a capacitor bank. Consequently, when the switches are closed, a high energy spark is created across the spark gap. This creates a shock wave in the liquid of the front cavity and drives the piston and member in the first direction. Additionally, means are provided for supplying gas under pressure to the front cavity as the piston and member move in the first direction.

---

This invention pertains to the art of driving mechanisms and more particularly to a high energy device which operates on the electrohydraulic effect to produce ultra fast acting reciprocal motion.

The invention will be described with particular reference to a preferred embodiment of drive mechanism adapted for operating a machine part requiring very rapid reciprocal movement; however, it will be appreciated that it is capable of broader application and may be used wherever high kinetic mechanical energy is required, such as in a press for high energy rate forming of metals.

Experience has shown that for many industrial purposes conventional hydraulic cylinders employed as driving mechanisms for machine parts are discouragingly slow. Most hydraulic cylinders operate at speeds of about seventeen feet per second while it is often necessary in industry to have speeds above 60 feet per second. For example, strip mills and rod mills employ high speed roll lanes which run at above 60 feet per second. Conventional hydraulic cylinders and other known drive mechanisms are generally not capable of operating machine tools at these speeds. Thus, cropping the ends of coils or cutting the exact lengths of rod cannot readily be done while the material is moving in the mill.

The present invention contemplates a drive mechanism which converts electrohydraulic energy into reciprocal kinetic energy for operating mechanisms requiring extremely high rates of movement of up to 300 feet per second.

In accordance with the present invention, an electrohydraulic energy conversion device is provided for reciprocating a member repeatedly along a path and in first and second directions with the second direction being opposite to the first direction. The device comprises a housing forming an elongated chamber extending along the path. A piston is positioned in the chamber to divide the chamber into front and aft cavities. An element is provided to connect the piston to the reciprocating member and an electrically nonconductive and noncombustible liquid is in at least the front cavity. The liquid generally fills the front cavity when the member has been moved in the second direction. Positioned in the front cavity are members forming a spark gap. Power leads connect the members through switches to a power supply including a capacitor bank. Consequently, when the switches are closed, a high energy spark is created across the spark gap. This creates a shock wave in the liquid of the front cavity and drives the piston and member in the first direction. Additionally, means are provided for supplying gas under pressure to the front cavity as the piston and member move in the first direction. This prevents the formation of a vacuum behind the moving piston.

A primary object is the provision of a driving mechanism capable of producing ultra fast reciprocal motion.

An additional object is the provision of a driving mechanism which is simple in construction and operation.

A further object is the provision of a piston type electrohydraulic mechanism provided with means to prevent formation of a vacuum behind the piston.

These and other objects and advantages will become apparent from the following description used to illustrate the preferred embodiment of the invention as read in connection with the accompanying drawings in which:

FIGURE 2 is a cross-sectional view of the power cylinder assembly taken on line 2—2 of FIGURE 1;

FIGURES 3 and 4 are diagrammatic showings of two embodiments of apparatus for supplying pressurized gas to the opposite ends of the power cylinder in synchronized relation with the movement of the piston.

Figure 1:
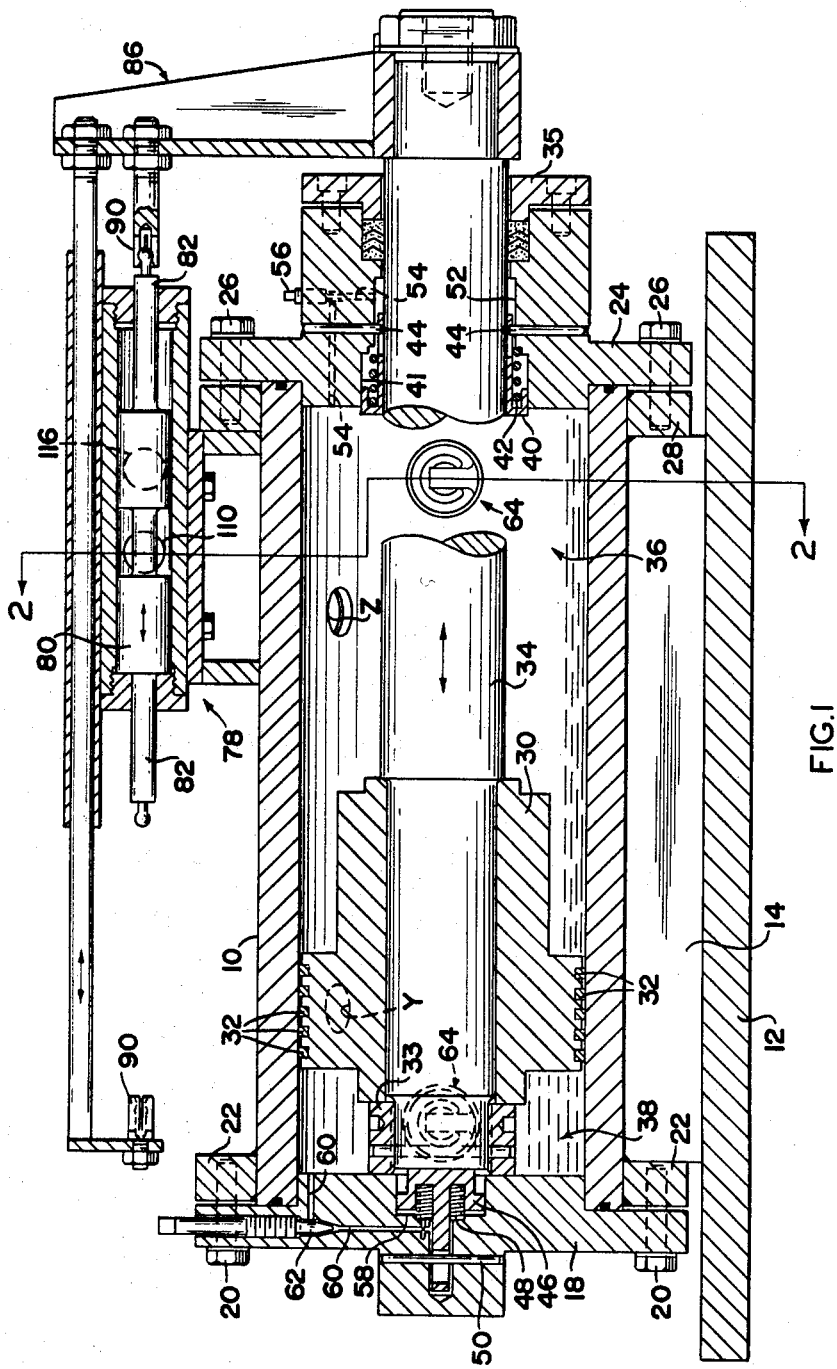
FIGURE 1 is a longitudinal cross-sectional view through the power cylinder assembly of the present invention.

Referring now to the drawings wherein the showings are for the purpose of illustrating preferred embodiments of the present invention only and not for the purpose of limiting same, FIGURE 1 shows a longitudinal section through a power cylinder assembly of a device constructed in accordance with the present invention.

In general, the power cylinder assembly comprises a heavy walled metal cylinder 10 horizontally mounted on a base plate 12 by legs 14. The opposite ends of the cylinder are closed by closure plates 18 and 24. Closure plate 18 is connected by bolts or screws 20 to a flange 22 welded to the left end of cylinder 10. Closure plate 24 is likewise connected by bolts 26 to a flange 28.

Reciprocally mounted within the cylinder is a piston 30. This piston divides the interior of the cylinder into two spark discharge chambers 36 and 38. Piston rings 32 are provided between the piston and the internal walls of the cylinder to maintain the two spark discharge chambers 36 and 38 completely sealed relative one another. Because these rings must provide a seal for both liquid and gas under relatively high pressure they must be relatively tight. Although many types of rings could be used, in the preferred embodiment, alternate rings of Teflon and steel are used.

Piston 30 is carried on piston rod 34 which extends through the right hand end of the cylinder. A sleeve 33 is pinned to the end of the piston rod and maintains the piston 30 securely connected thereto. Piston rod 34 is sealed at its point of exit through end plate 24 by packing and a packing retainer ring 35. The right hand end of the piston rod is the power output end and is connected to a driven mechanism (not shown) such as a forming press or cutting machine.

Means are provided in both end plates 18 and 24 to cushion the movement of the piston at the end of its stroke. These means can take a variety of forms; however, in the preferred embodiment they comprise cushion pistons reciprocably mounted in the end plates and biased outwardly by springs. As shown in FIGURE 1, the right hand closure plate has an annular cushion piston 40 surrounding the piston rod and slidably retained in a cylinder 41 formed in the end plate. This piston is biased outwardly by spring 42 and retained in the end plate by a pair of pins 44 which extend through the end plate and into elongated slots formed in the right end of the piston member 40. In addition to the spring 42, a fluid chamber 52 is provided within the end wall. This chamber is connected with the spark discharge chamber 36 by a bleed line 54. A needle valve 56 is positioned in this flow line and serves to control the flow of fluid therethrough. Thus, when piston 30 moves to the right and forces against piston member 40, fluid within the chamber 52 will be forced through line 54. Needle valve 56 can be adjusted to limit the rate of flow from this chamber thus providing an adjustable cushioning for piston 30.

A similar cushion piston 46 is provided in end plate 18. This piston is biased outwardly by a spring 48 and is retained in the end plate by a pin 50 which extends through an elongated slot formed in the end of the piston member. A fluid chamber 58 is formed behind the piston and is connected with the spark discharge chamber 38 by a bleed line 60. A needle valve 62 is positioned in this line to control the rate of flow of fluid from chamber 58.

As best shown in FIGURE 2, mounted in each of the spark discharge chambers 38 and 36 are spark devices 64. These devices could be any type which would produce a high voltage spark between their electrodes; however, as shown in the preferred embodiment, they comprise two pairs of large spark plugs. One pair is positioned in each spark discharge chamber diametrically opposite one another and spaced from the end wall. As shown, these spark plugs comprise a threaded sleeve member 74 which is screwed into socket 76 welded to the cylinder 10. Positioned centrally of the sleeve 74 and insulated therefrom by insulation 72 is a first electrode 66. A second electrode 68 formed on sleeve 74, is spaced from the end of electrode 66. The spacing of the electrodes would vary depending on the voltage to be supplied. A connector 70 is at the outer end of electrode 66 and permits the necessary power supply to be connected to the device.

Spark discharge chambers 36 and 38 contain a noncombustible, electrically nonconductive liquid such as distilled water. As shown in FIGURE 1, a metered quantity of this liquid is introduced into both chambers. The amount of the liquid introduced is such that when the piston is moved to either end of its stroke, the spark discharge chamber of smallest volume is filled to between 90 and 95% of its volume. When the piston is at the end of its stroke in either direction, the spark plugs at that end of the cylinder are thus completely submerged. Consequently, when a high voltage spark is discharged between the electrodes, the water between the electrodes is ionized and the gas breaks down. Rapid heating of the water takes place in a small area around the gap. This results in a very high pressure which moves radially outwardly as a shock wave. This phenomenon is well known, and is generally referred to as the "electrohydraulic effect." In the device of the present invention, the shock wave causes the piston to be driven at a high velocity and with a great force to the opposite end of the cylinder, thus, producing a large amount of usable kinetic energy.

To avoid having the piston jump away from the opposite end wall and to avoid having a vacuum formed behind the piston during its movement, the present invention supplies the spark chamber behind the moving piston with a compressed gas. This gas could be supplied in a variety of ways. FIGURES 3 and 4 show two satisfactory methods of supplying the necessary compressed gas behind the moving piston.

FIGURE 3 shows a system in which gas under pressure is placed in the space above the liquid in both spark chambers and sealed therein. The gas spaces in the spark chambers are then connected through valved lines. In the preferred embodiment the means utilized to control the flow of the compressed gas from one spark chamber to the other during movement of the piston comprises a two-position, two-way valve 78. When the piston moves from left to right the valve is moved to the position which permits gas to flow through line 116 from the right end of the cylinder to line 118 through a check valve 120 to the left end of the cylinder thereby preventing a vacuum from forming behind the moving piston. When the piston is moving from right to left the valve is moved to the other position. The valve then permits flow from the left end of the cylinder through line 114, check valve 112 and line 110 to the right end of the cylinder.

Although a variety of means could be utilized for controlling the movement of valve 78 in timed relation with the movement of the piston, the preferred arrangement is shown in FIGURE 1. As shown in FIGURE 1, valve 78 is mounted at the top of the cylinder 10 and comprises a cylindrical valve chamber in which is slidably retained a spool valve 80. Extending from opposite ends of the spool valve 80 are actuation shafts 82. A ball-shaped connecting element is formed at the end of each of the shafts 82. These ball connecting elements are adapted to be gripped within the resilient fingers of nippers 90 carried from arm 86 which is connected to piston rod 34. As can be seen, when piston rod 34 is in the position shown in FIGURE 1, the right hand ball connector is gripped by the corresponding nipper 90. Thus, as the piston rod moves to the right during the power stroke, the spool valve 80 is pulled to the right by movement of nipper 90. This then positions the valve so as to permit gas to flow from the right hand end of the cylinder through line 116 to line 118 and to the left hand end of the cylinder. Also, it should be noted that as the cylinder reaches the right hand end of the stroke, the left hand nipper 90 contacts and grips the left hand ball connector. This places the assembly in position for a power stroke to the left.

FIGURE 4 shows a second method of supplying pressurized gas behind the moving piston. In this embodiment, a supply source 130 of gas under substantial pressure is alternately connected to the chamber behind the moving piston by a two-position, four-way valve 131.

With the piston in the left hand end of the cylinder preparatory to making a stroke to the right, the valve 131 is in the position shown in FIGURE 4. Thus, gas under pressure from gas supply 130 is communicated through line 138 to inlet Z of the right hand end of the cylinder. However, after the piston has moved a small distance to the right, the valve is moved to the position wherein the right hand spark chamber is communicated to atmosphere and the left spark chamber communicated with the pressure gas supply. The same arrangement described above with reference to the FIGURE 3 embodiment is utilized to control the positioning of valve 131.

The means to supply the necessary high voltage power to the power cylinder is shown in FIGURES 3 and 4. These means comprise banks of condensers 104 which are supplied with current from the secondary side of transformer 100. Diodes 102 serve to rectify the output of the transformer to supply the necessary direct current to the condensers. One side of each of the condensers 104 is connected by a line 109 to the cylinder housing. The metal housing serves to complete the connection of the condensers to electrode 68. The other side of each group of condensers is connected through lines 111 and 115, controlled by switches 106 and 108, respectively, to the center electrode 66 of a respective spark plug.

Thus, it can be seen that by selectively closing switches 108 or 106 a high voltage spark will be generated between the electrodes in either spark discharge chambers 38 or 36.

Operation

Referring to FIGURE 3, the operation of this modification will be described. Assuming that the condensers 104 have been completely charged from transformer 100 and that the piston is in its left hand position as shown in the drawing, switches 108 are simultaneously closed. Consequently, sparks are generated between electrodes 66 and 68 of both spark plugs 64 in chamber 38. As previously described, this creates a large shock wave in the liquid within spark chamber 38. Consequently, piston 30 moves rapidly to the right driving the piston rod 34 and the load device connected thereto. As the piston is moved to the right, valve 78 is moved to permit the precompressed gas within spark chamber 36 to pass through line 116 to line 118 thus supplying the necessary pressurized gas behind the piston to prevent a vacuum from being formed and preventing the piston from rebounding after reaching the end of its stroke. As piston 30 reaches the end of its stroke, it contacts cushioning piston 40. Piston 40 acts against spring 42 and the fluid within cushioning chamber 52. This forces the fluid in the cushioning chamber through the needle valve and into the spark chamber. Since the rate of flow through the needle valve is restricted, movement of the piston is slowed and stopped.

Because the high pressure gas is now in chamber 38 and cannot escape back through line 118 because of check valve 120, the piston will not rebound from the cushioning piston 40 but will be held at the right hand end of the cylinder. At this time, the piston is in position for a power stroke to the left. Switches 108 are opened and switches 106 closed. Thus, a high voltage spark is generated between electrodes 66 and 68 of the spark plugs within spark chamber 36. This creates a shock wave within the liquid which drives the piston back to the left. Simultaneously, valve 78 is moved to the position in which the compressed gas within spark chamber 38 is permitted to pass through line 114 and line 112 to the position behind the moving piston, thus preventing formation of a vacuum or rebounding of the piston as it is striking the left hand end of the cylinder.

The operation of the device as shown in FIGURE 4 is substantially the same; however, assuming the piston is in its left hand end position as shown in FIGURE 4, valve 131 is connecting the pressure gas supply 130 with connection Z through line 138. However, when a spark is discharged between the electrodes of the spark plugs positioned in chamber 38 and piston 30 has moved a short distance to the right, the valve is shifted so that high pressure gas is communicated behind the piston from the pressure gas supply and the gas within the other spark discharge chamber is exhausted to atmosphere. All other aspects of this modification are the same as described above with regard to the FIGURE 3 modification.

The invention has been described in great detail sufficient to enable one skilled in the art of driving mechanisms to duplicate the invention. Obviously, modifications and alterations of the preferred embodiment described will occur to others upon a reading and understanding of this specification and it is my intention to include all such modifications and alterations as part of my invention insofar as they come within the scope of the appended claims.

Having thus described my invention, I claim:
1. A device for reciprocating a member repeatedly along a path and in a first and second direction with said second direction being opposite to said first direction, said device comprising:
 (a) a housing forming an elongated chamber extending along said path;
 (b) a piston in said chamber to divide said chamber into front and aft cavities;
 (c) an element connecting said piston onto said reciprocating member;
 (d) an electrically nonconductive and noncombustible liquid in at least said front cavity, said liquid generally filling said front cavity when said member has been moved in said second direction;
 (e) members forming a spark gap in said front cavitiy;
 (f) power leads to said members;
 (g) a switch in said power leads to establish an electrical circuit in series with said spark gap;
 (h) a power supply in said circuit and including a capacitor bank for creating, when said switch is closed, a high energy spark across said spark gap after said member has been moved in said second direction to create shock waves in said liquid of said front cavity and drive said piston and member in said first direction; and,
 (i) means for supplying gas under pressure to said front cavity as said piston and member move in said first direction.

2. A device as defined in claim 1 wherein said means for supplying gas under pressure to said front cavity comprises a source of pressurized gas and a valve controlled by the movement of said piston.

3. A device as defined in claim 1 wherein said means for supplying gas under pressure to said front cavity comprises valved lines connected between said front and aft cavities.

4. A device as defined in claim 1 wherein cushioning means are provided to cushion the movement of said piston as it approaches the end of its movement in said first direction.

5. A device for reciprocating a member repeatedly along a path and in a first and second direction, with said second direction being opposite to said first direction, said device comprising:
 (a) a housing forming an elongated chamber extending along said path;
 (b) a piston in said chamber to divide said chamber into front and aft cavities;
 (c) an element connecting said piston onto said reciprocating member;
 (d) a noncombustible and electrically nonconductive liquid in said front and aft cavities, said liquid in said front cavity substantially filling said front cavity when said member has been moved in said second direction, said liquid in said aft cavity substantially filling said aft cavity when said member has been moved in said first direction;
 (e) members forming spark gaps in each of said cavities;
 (f) power leads to said spark gap forming members;
 (g) a power supply connected to said leads and including a capacitor bank;
 (h) switches in said leads for selectively connecting said power source to said spark gaps in said front and aft cavities for selectively producing a high energy spark across said spark gaps; and,
 (i) means for selectively supplying gas under pressure to said front and aft cavities in response to movement of said member in said first and second directions respectively.

References Cited
UNITED STATES PATENTS 740,117    9/1903    Fraley _____ 60—27
3,267,780   8/1966    Roth.

MARTIN P. SCHWADRON, *Primary Examiner.*
C. B. DORITY, *Assistant Examiner.*